UNITED STATES PATENT OFFICE.

JAMES MILLEN, OF STAPLETON, NEW YORK.

IMPROVEMENT IN FRUIT-JELLIES.

Specification forming part of Letters Patent No. 208,111, dated September 17, 1878; application filed May 17, 1878.

*To all whom it may concern:*

Be it known that I, JAMES MILLEN, of Stapleton, in the county of Richmond and State of New York, have invented an Improvement in Fruit-Jellies, of which the following is a specification:

Dried fruits have been used in the manufacture of jelly, the same being soaked or boiled in water and pressed. In that case the result is a jelly from the dried fruit alone.

My improvement relates to a jelly in which the body of the jelly is the pulp of dried currants, and the same is flavored with the juice of green or ripe fruit, which at the same time allows the jelly to be of the proper consistence.

I employ apples, pears, or other fruits, in their natural condition, and extract the juice from the same either by grinding and pressing or by boiling, steaming, or pressing, or both; and into the liquid thus obtained I introduce dried currants, and allow the same to soak, or else the mass is boiled for two or three hours.

I prefer to use about one or two pounds of such dried fruit to each gallon of juice.

The mass is squeezed and strained or filtered, and the liquid is concentrated by evaporation to the condition of a jelly, or sugar may be added in the usual manner; and the jelly, when properly concentrated, is placed in suitable jars or vessels to hold the same.

I am aware that jelly has been made from the juices of dried and green fruits of the same kind, and reference is made to Letters Patent 156,876 for such a jelly.

In my jelly the dried currants furnish the body, and the jelly requires less evaporation or concentration in the manufacture than heretofore, and it is not liable to injury by atmospheric changes, and the said dried currants act to sweeten the jelly and lessen the amount of sugar required.

I claim as my invention—

The jelly herein specified, composed of the pulp of dried currants and the juice of other fruits, substantially as set forth.

Signed by me this 14th day of May, A. D. 1878.

JAMES MILLEN.

Witnesses:
GEO. T. PINCKNEY,
CHAS. H. SMITH.